United States Patent [19]

Reinartz et al.

[11] Patent Number: 4,838,305

[45] Date of Patent: Jun. 13, 1989

[54] PRESSURE DIFFERENTIAL VALVE

[75] Inventors: Hans-Dieter Reinartz, Frankfurt am Main; Helmut Steffes, Hattersheim; Edwin Czarnetzki, Elz, all of Fed. Rep. of Germany

[73] Assignee: Alfred Teves GmbH, Frankfurt am Main, Fed. Rep. of Germany

[21] Appl. No.: 128,127

[22] Filed: Dec. 3, 1987

[30] Foreign Application Priority Data

Dec. 9, 1986 [DE] Fed. Rep. of Germany ....... 3641968

[51] Int. Cl.⁴ ............................................ G05D 16/08
[52] U.S. Cl. ................................ 137/505.13; 303/9.75
[58] Field of Search .................. 137/505.13; 303/9.73, 303/9.75

[56] References Cited

U.S. PATENT DOCUMENTS

| 1,954,930 | 4/1934 | Greenlee | 137/505.13 |
| 2,189,750 | 2/1940 | Barge | 137/505.13 X |
| 2,892,468 | 6/1959 | Beuchle | 137/505.13 |
| 3,554,611 | 1/1971 | Kawabe et al. | 303/9.73 |
| 3,612,618 | 10/1971 | Swanson | 303/9.75 X |

FOREIGN PATENT DOCUMENTS

| 67940 | 3/1958 | France | 137/505.13 |
| 51146 | 7/1932 | Norway | 137/505.13 |

Primary Examiner—Stephen Hepperle
Attorney, Agent, or Firm—James B. Raden

[57] ABSTRACT

A pressure differential valve, in particular for pressure fluid-actuatable motor vehicle brake systems, is disclosed and comprises a housing having a valve arrangement which is loaded by a preload force and which governs a connection between an inlet and an outlet. The preload force determines the gradient of pressure between the inlet pressure and the outlet pressure of the valve. In order to create a pressure differential valve which can be easily mounted and responds quickly at a low change-over pressure, the valve arrangement is actuatable by a tappet which is movable in dependence on the position of a diaphragm.

4 Claims, 1 Drawing Sheet

PRESSURE DIFFERENTIAL VALVE

BACKGROUND OF THE INVENTION

The present invention relates to a pressure differential valve.

Valves of this type are used in order to obtain a constant gradient of pressure between an inlet pressure and an outlet pressure. A pressure differential valve of this type is disclsed in the German patent application No. 36 36 409.6 which corresponds to pending U.S. application Ser. No. 112,635 filed Oct. 22, 1987 for Pressure Control Valve. This U.S. Application is assigned to the assignee of this application. In that valve, a differential piston whose larger pressurized surface is associated with the outlet pressure is displaced in opposition to the force of a preloading spring in a manner such that a spring-loaded ball seat valve is brought into a closed position.

A valve design of this type includes a multitude of component parts that are expensive to produce, has a great overall length and a high weight. The change-over point of this valve is determined by the pressure prevailing in the outlet so that, as a result, a considerable volume of fluid must be conveyed by way of the valve overflow cup during pressure reduction until the differential piston returns to its initial position and thereby establishes a free flow from inlet to outlet.

SUMMARY OF THE INVENTION

It is a principle object of the present invention to provide a pressure differential valve of the type referred to which is characterized by low production costs, a short overall length and a low change-over pressure.

These objects are achieved by a valve incorporating the features of the present invention.

According to the invention, a very low change-over pressure can be achieved through the utilization of a diaphragm for the determination of the change-over pressure which has the advantage that a large effective surface is available at a low friction. The diaphragm acts in cooperation with a control force acting upon it and is responsible both for closing of the valve in the event of a pressurre build-up and for opening of the valve arrangement in the event of a pressure reduction.

According to an important aspect of the invention, renewed free flow of the pressure fluid is provided for in the event of a pressure reduction by a diaphragm capable of being acted upon by the inlet pressure. Operating the diaphragm by the inlet pressure provides very low hysteresis since, when there is a very quick reduction of the inlet pressure, a very quick flow from the outlet toward thee inlet is also made possible. The pressure in the outlet area is thus reduced more quickly.

The use of a diaphragm as a pressure-sensitive control element provides for a compact valve design with a low number of component parts and easy assembly.

BRIEF DESCRIPTION OF THE DRAWING

The function and further advantages of the present invention will become apparent from the following Detailed Description of the Preferred Embodiment of the inventive pressure differential valve and the drawings of which.

DETAILED DESCRIPTION OF A PREFERRED EMBODIMENT

Figure 1:
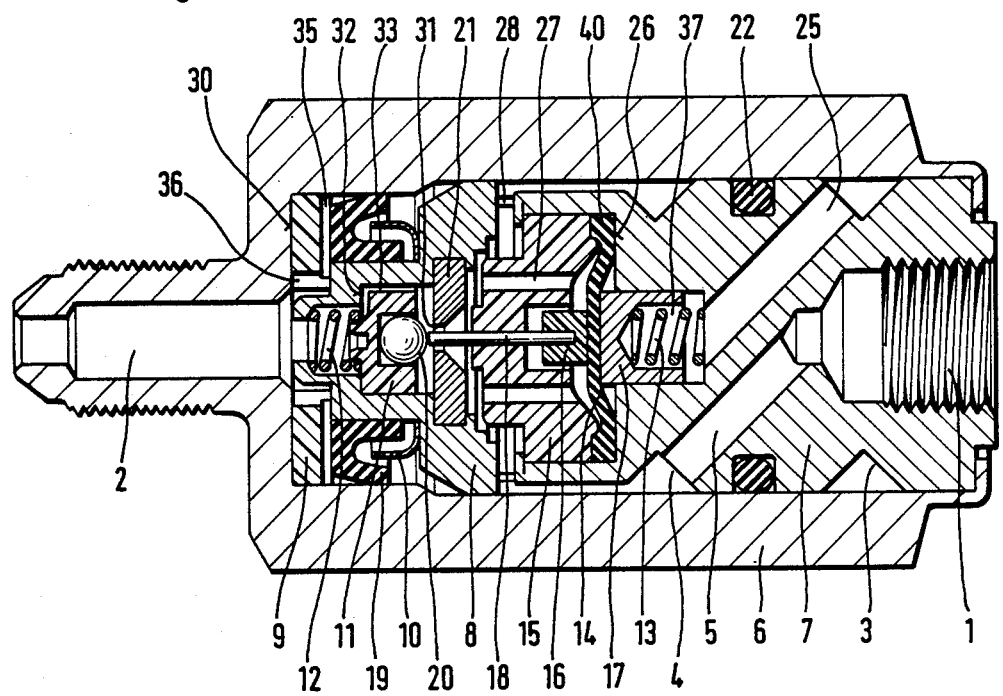
FIG. 1 is a longitudinal cross section through the pressure differential valve according to the invention showing details of a pipe valve-type construction.

The pressure differential valve illustrated in FIG. 1 comprises a stepped housing 6 provided with a stepped valve. Within the area of the outlet 2, the housing is provided with an external thread. An inlet 1 is designed as a threaded blind-end bore and is provided in a closure member 7. The inlet 1 communicates by way of a diagonal bore 5 with a radially arranged groove 4 which has the shape of a notch. Another notch-shaped annular groove 3 is also arranged in the outer surface of the closure member 7 and is axially displaced in the direction of the inlet 1. Between the two grooves 3 and 4, an O-ring 22 is provided which is accommodated in a known manner in another annular groove and forms a seal between the closure member 7 and the housing 6.

In the end of the closure member 7, which end is opposite the inlet 1, a stepped bore is provided which communicates by way of a diagonal bore 25 with the annular groove 3. A diaphragm spring 13 and a diaphragm piston 17 which surrounds the spring 13 are arranged in the smaller-diameter portion of the stepped bore in the closure member 7. A diaphragm 14 is arranged in the larger-diameter bore portion. The diaphragm is brought into abutment with a surface 26 through the intermediary of an intermediate disc 15 which is sealed to the closure member 7. The diaphragm 14 is provided on its outer diameter with a bead 40 which engages a corresponding recess on one end face of the intermediate disc 15. The diaphragm is thus securely fixed.

The stepped intermediate disc 15 has a central bore which serves to guide a tappet 18. The end of the disc 15 facing the diaphragm 14 has an enlarged diameter into which protrudes a tappet shoe 16 which is fixed to the tappet 18 and abuts against the diaphragm 14.

The intermediate disc 15 is made of a plastic material and is provided, approximately on its central diameter, with a plurality of flow bores 27. The end of the intermediate disc 15 which is directed away from the diaphragm 14 projects into the axial stepped passage bore of a valve body 8 which is clamped in the passage bore of the housing 6 against a disc 9 which abuts on a surface 30. The valve body 8 is acted upon by the closure member 7 which is sealed in the housing 6.

The actuation of the valve body 8 by means of the closure member 7 is effected by axially directed portions 28. The valve body 8 has both a stepped outer contour and a stepped passage bore. The smallest-outer diameter step of the valve body 8 faces the outlet 2 and is surrounded by the disc 9 whose outer diameter extends to the housing 6. An overflow cup 19 and a bearing disc 10 are arranged on the step adjacent to the small diameter step. The overflow cup 19 contacts the housing 6 with its radially outside sealing portion. The overflow cup is shaped as a grooved ring and comprises in part the bearing disc 10 which has a U-shaped cross-section.

The valve plate 21 is pressure-tightly sealed in a known manner in the largest-diameter area of the stepped passage bore of the valve body 8. Protruding through the passage 31 in the valve plate 21 is the tappet 18. The plate 21 is flared toward the intermediate plate 15 and forms a valve seat ara for the valve closing member 20 which is shaped in the form of a ball on its side facing the outlet 2. The valve closing member 20 is substantially surrounded by a ball guide 11 which is preferably made of a plastic material. In the unpressurized state, the ball guide 11, loaded by the tappet 18, abuts against a step 32 of the central bore of the valve body 8 and is provided with flow channels 33 on its outer contour. The ball guide 11 is acted upon by a valve spring 12 from its side facing the outlet 2. The valve spring 12 bears against another step of the valve body bore.

The disc 9 is provided on both of its end faces with a plurality of radial grooves 35 (the grooves facing the surface 30 are not illustrated). The grooves 35 do not face each other exactly but rather are displaced relative to each other by a specific angle on the radial plane. One groove 35 each on the front side is connected with a corresponding groove on the back side through the intermediary of an arc-shaped recess 36. Due to the design of the disc 9, it need not have a specific position when being mounted.

When unpressurized, the pressure differential valve assumes the position as illustrated. The valve closing member 20 is then lifted off its seat by means of the diaphragm spring 13 and the tappet 18. The valve spring 12 is compressed.

When pressure is being built up, pressure fluid flows through the inlet 1, the bore 5, the passage 31 and the flow channels 33 to the outlet 2. At first, the inlet pressure in the inlet 1 equals the outlet pressure in the outlet 2. When a certain pressure, the change-over pressure, is reached, the diaphragm 14, which is pressurized by way of the flow bores 27, and the diaphragm piston 17 are displaced in opposition to the force of the diaphragm spring 13. The tappet shoe 16 and the tappet 18 are also displaced. In order toa void compression of the air in the chamber 37, the latter is connected with the atmosphere through the bore 25. Tests have, however, shown that even with a closed bore 25, the pressure differential valve functions properly. Accordingly both the bore 25 and the annular groove 3 could be omitted. In addition, the omission of the atmospheric connection would be advantageous in that no pressure fluid could escape from the pressure differential valve in the event of a porous diaphragm.

Due to the above-mentioned movement of the tappet 18, the valve closing member 20, loaded by the valve spring 12, is brought into sealing contact with the passage 31 in the valve plate 21. In order to avoid oscillation of the valve closing member 20 due to the flow dynamics, the ball guide 11 is interposed between the valve spring 12 and the valve closing member 20.

After the valve closing member 20 has been brought into contact with the valve plate 21, a difference of pressure is established between the pressure in the inlet 1 and that in the outlet 2. The difference of pressure is determined by the force of the valve spring 12. Accordingly, if the inlet pressure is further increased after the change-over pressure has been reached, the pressure in the outlet 2 maintains the value of the change-over pressure until such time as the pressure in the inlet becomes higher by the difference p whichis required to lift the valve closing member 20 off its seat on the valve plate 21 in opposition to the force of the valve spring 12. When the pressure is further increased, the valve closing member 20 effects a so-called breathering movement, i.e., it opens and closes at very short intervals so that pressure fluid is allowed to flow toward the outlet 2. The amount of pressure fluid which flows in this state is such that the pressure difference p is always maintained.

When the inlet pressure is reduced, the passage 31 remains closed until the change-over pressure has been reached in the inlet chamber. The pressure compensation between the outlet pressure and the inlet pressure is effected such that the pressure fluid overflows the overflow cup 19 at the housing wall by way of the recess 36 and the grooves 35 and extends radially outwardly around the stepped outer contour of valve body 8. After the change-over pressure has been reached in the inlet, the diaphragm piston 17, the diaphragm 14 and the tappet 18 return to their initial position with the valve closing member 20 thus being held off the valve plate. Thereafter, the pressure reduction takes place by way of the passage 31.

Figure 2:
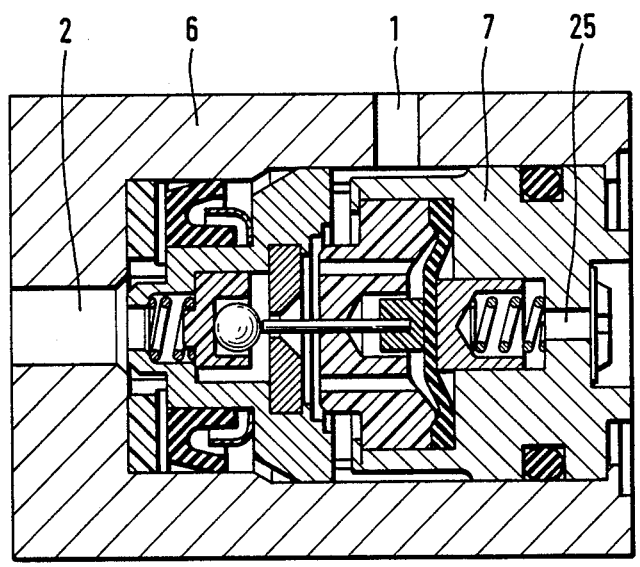
FIG. 2 is a cross-section of the pressure differential valve according to the invention showing details of a separate built-in valve-type construction.

FIG. 2 shows an embodiment of the differential valve which has a built-in valve whose function is identical to that of the pipe-type valve illustrated in FIG. 1. The major difference being in the arrangement of the bore for the inlet 1 and the bore 25 for the atmospheric connection.

The bore for the inlet 1 of the pressure fluid is disposed at a right angle (vertically as shown in FIG. 2) to the stepped housing bore in the housing 6 and the bore 25 for the atmospheric connection is arranged coaxially with the housing bore in the closure member 7. By this arrangement, the groove 4 and the annular groove 3 are omitted and the closure member 7 and thus the total pressure differential valve can have a shorter overall length.

What is claimed is:

1. A pressure differential valve, comprising a housing, a valve arrangement in said housing, said valve arrangement being loaded by a preload force and controlling a connection between an inlet and an outlet, the preload force determining the difference in pressure between an inlet pressure and an outlet pressure, said valve arrangement including a valve body and an overflow cup in contact with said outlet and fluidly connected to said inlet around a stepped outer contour of said valve body, such that a pressure compensation between said inlet pressure and said outlet pressure is effected when said overflow cup overflows with pressure fluid and said pressure fluid flows from said outlet to said inlet around said stepped outer contour of said valve body, a diaphragm, said diaphragm being pressurized responsive to said inlet pressure only and on the side facing said outlet, a tappet being connected for movement by said diaphragm and said tappet connected to actuate said valve arrangement, whereby said valve arrangement is movable in dependence upon the position of the diaphragm.

2. The pressure differential valve according to claim 1 further including means for exerting a control force on said diaphragm in a direction such that the tappet is loaded in the direction of opening of the valve arrangement.

3. The pressure differential valve of claim 1 wherein the valve arrangement includes a valve closing member, said valve closing member opening and closing at short intervals so that pressure fluid is allowed to flow toward the outlet.

4. The pressure differential valve of claim 3 wherein the valve closing member is substantially surrounded by a ball guide.

* * * * *